(12) United States Patent
Welker et al.

(10) Patent No.: US 8,382,157 B2
(45) Date of Patent: Feb. 26, 2013

(54) STEERING COLUMN

(75) Inventors: David L. Welker, Lafayette, IN (US);
Philip S. Peterson, Lafayette, IN (US);
Richard J. Eckhart, Buck Creek, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 196 days.

(21) Appl. No.: 12/858,711

(22) Filed: Aug. 18, 2010

(65) Prior Publication Data

US 2012/0043746 A1    Feb. 23, 2012

(51) Int. Cl.
*B62D 1/16* (2006.01)
(52) U.S. Cl. ........................................................ 280/779
(58) Field of Classification Search .................. 280/775, 280/777, 779; 74/493
See application file for complete search history.

(56) References Cited

U.S. PATENT DOCUMENTS

| | | | |
|---|---|---|---|
| 4,616,522 A | 10/1986 | White et al. | |
| 4,746,144 A | 5/1988 | Kulczyk | |
| 5,769,455 A | 6/1998 | Duval et al. | |
| 6,398,259 B1 | 6/2002 | Palmer et al. | |
| 7,360,793 B2 * | 4/2008 | Hoshino et al. | 280/777 |
| 2010/0186536 A1 | 7/2010 | Cartwright | |

* cited by examiner

*Primary Examiner* — Faye M. Fleming
(74) *Attorney, Agent, or Firm* — Tarolli, Sundheim, Covell & Tummino LLP (57) ABSTRACT

An apparatus for supporting a steering column (40) in a vehicle (50) adjacent an instrument panel of the vehicle includes a mounting assembly (30) that connects the steering column (40) to the vehicle (50). The mounting assembly (30) includes at least one holding element (170) that has a first condition that blocks pivotal movement of the steering column (40) relative to the vehicle (50). The at least one holding element (170) has a second condition that permits pivotal movement of the steering column (40) relative to the vehicle (50) in response to impact forces urging the steering column (40) to pivot relative to the vehicle (50).

26 Claims, 8 Drawing Sheets

STEERING COLUMN

TECHNICAL FIELD

The invention relates to vehicle steering columns and, in particular, relates to a mounting assembly for permitting pivotal movement of a steering column relative to a vehicle in response to impact forces upon the steering column.

BACKGROUND

Steering columns that collapse during vehicle crashes are known in the art. During front impact vehicle crashes, the occupant of the vehicle is moved in a forward direction within the vehicle and towards the steering wheel until the occupant ultimately strikes or impacts the steering wheel. Since impact forces between the occupant and the steering wheel may be undesirably high, the steering column may be constructed to collapse in a direction away from the occupant to reduce impact reaction forces. In particular, the steering column may be constructed as a telescoping unit in which pins or rods maintain the telescoping members in an extended condition during normal operation of the vehicle but break upon occupant impact with the steering wheel to allow the telescoping members to retract within one another to reduce impact forces between the occupant and the steering wheel.

While a telescoping steering column is useful for front or rear impact vehicle collisions, such telescoping steering columns do not collapse if the occupant strikes the underside of either the steering column or the steering wheel. These situations arise in military settings when the vehicle drives over or otherwise is impacted by an explosive device that causes the occupant to travel upward towards the roof of the vehicle, resulting in the occupant's legs striking the underside of the steering column and/or steering wheel with high impact forces. Therefore, there is a need in the art for a device that reduces impact forces between an occupant and the steering column when the occupant strikes the underside of the steering column and/or steering wheel.

SUMMARY OF THE INVENTION

In accordance with an aspect of the present invention, an apparatus for supporting a steering column in a vehicle adjacent an instrument panel of the vehicle includes a mounting assembly that connects the steering column to the vehicle. The mounting assembly includes at least one holding element that has a first condition that blocks pivotal movement of the steering column relative to the vehicle. The at least one holding element has a second condition that permits pivotal movement of the steering column relative to the vehicle. The at least one holding element changes from the first condition to the second condition in response to impact forces urging the steering column to pivot relative to the vehicle.

In accordance with another aspect of the present invention an apparatus for a steering column comprising a steering shaft rotatable about a steering axis to effectuate steering movement of vehicle wheels includes a mounting assembly for connecting the steering column to the vehicle adjacent an instrument panel of the vehicle. The mounting assembly includes a first bracket that is connectable to the steering column and a second bracket that is connectable to the vehicle. A hinged connection interconnects the first and second brackets for pivotal movement relative to each other. A holding element has a first condition that blocks pivotal movement of the first bracket relative to the second bracket. The holding element has a second condition that permits pivotal movement of the first bracket relative to the second bracket. The holding element changes from the first condition to the second condition in response to a predetermined amount of force applied to the steering column and urging pivotal movement of the first bracket relative to the second bracket.

In accordance with another aspect of the present invention, an apparatus for supporting a steering column in a vehicle that includes a steering gear and extends in a fore-aft direction, the steering column comprising a steering shaft rotatable about a steering axis to effectuate steering movement of vehicle wheels includes a mounting assembly that pivotably connects the steering column to the vehicle. The mounting assembly has a first condition for positioning the steering column such that the steering axis extends at a first angle relative to the for-aft direction of the vehicle. The mounting assembly has a second condition for positioning the steering column such that the steering axis extends at a second, different angle relative to the fore-aft direction of the vehicle in response to impact forces urging the steering column to pivot relative to the instrument panel. A telescoping device rotatably connects the steering column to the steering gear. The telescoping device has a first length when the mounting assembly is in the first condition and a second, greater length when the mounting assembly is in the second condition.

Other objects and advantages and a fuller understanding of the invention will be had from the following detailed description of the preferred embodiments and the accompanying drawings.

DETAILED DESCRIPTION

The invention relates to vehicle steering columns and, in particular, relates to a mounting assembly for permitting pivotal movement of a steering column relative to the vehicle in response to impact forces upon the steering column. FIGS. 1-3B illustrate a mounting assembly 30 that pivotably connects a steering column 40 to a portion of a vehicle, illustrated in phantom at 50, such as a vehicle instrument panel. Alternatively, the mounting assembly 30 may help to connect the steering column 40 to a firewall or frame (not shown) of the vehicle 50.

Figure 1:
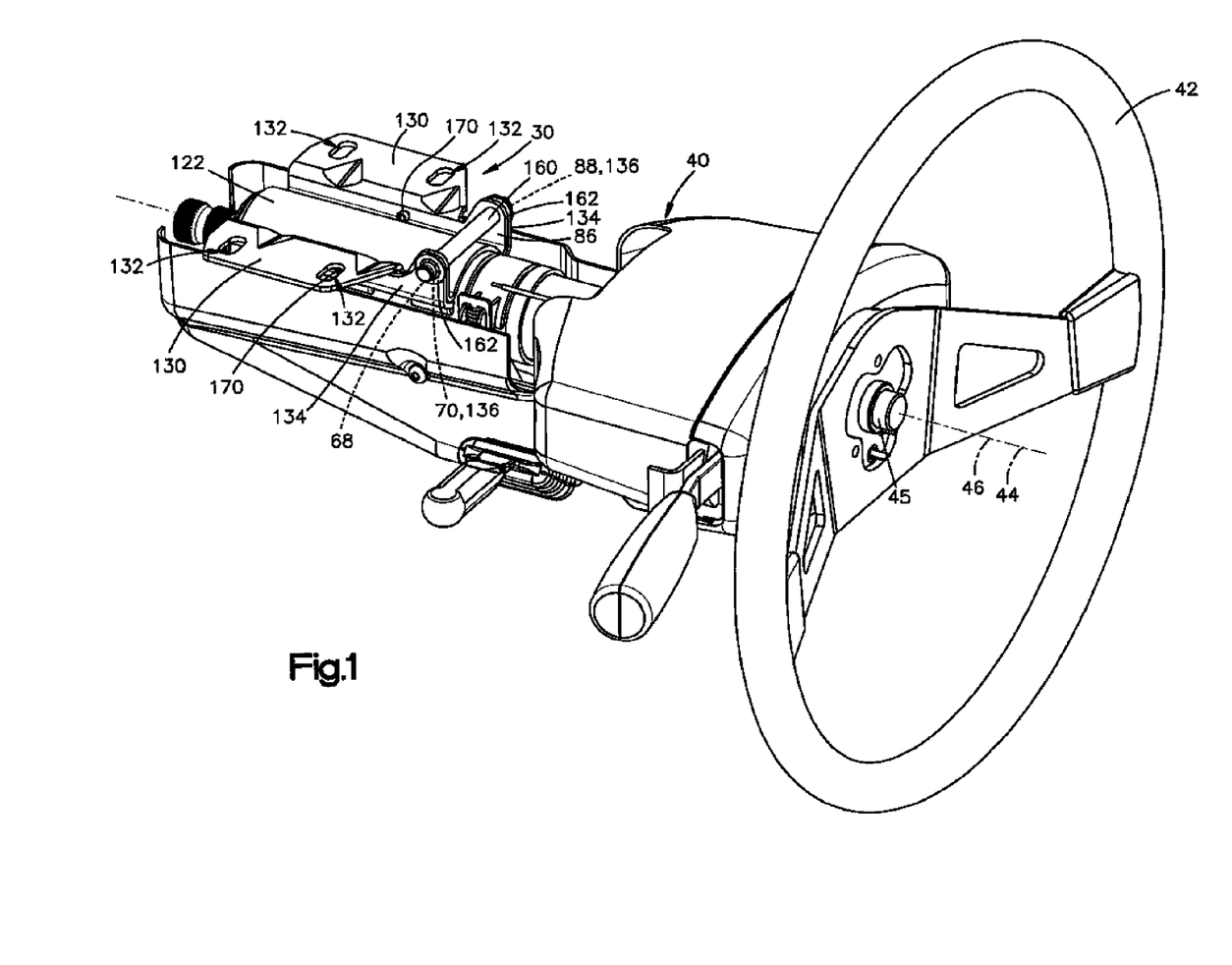
FIG. 1 is a schematic illustration of a mounting assembly for a steering column in accordance with the present invention.

The steering column 40 includes a steering wheel 42 secured to a sheering shaft 45 that is rotatable about a steering axis 44 to effectuate steering movement of vehicle wheels (not shown). As shown in FIG. 1, the steering axis 44 may be coincident with an axis 46 that represents the fore-aft direction of the vehicle 50. Alternatively, the steering axis 44 may extend at an angle (not shown) relative to the axis 46. The steering column 40 may be capable of tilting and/or telescoping relative to the vehicle 50 to place the steering wheel 42 in a desired position relative to the vehicle occupant (not shown). Alternatively, the position of the steering wheel 42 within the vehicle 50 may be fixed.

Figure 2:
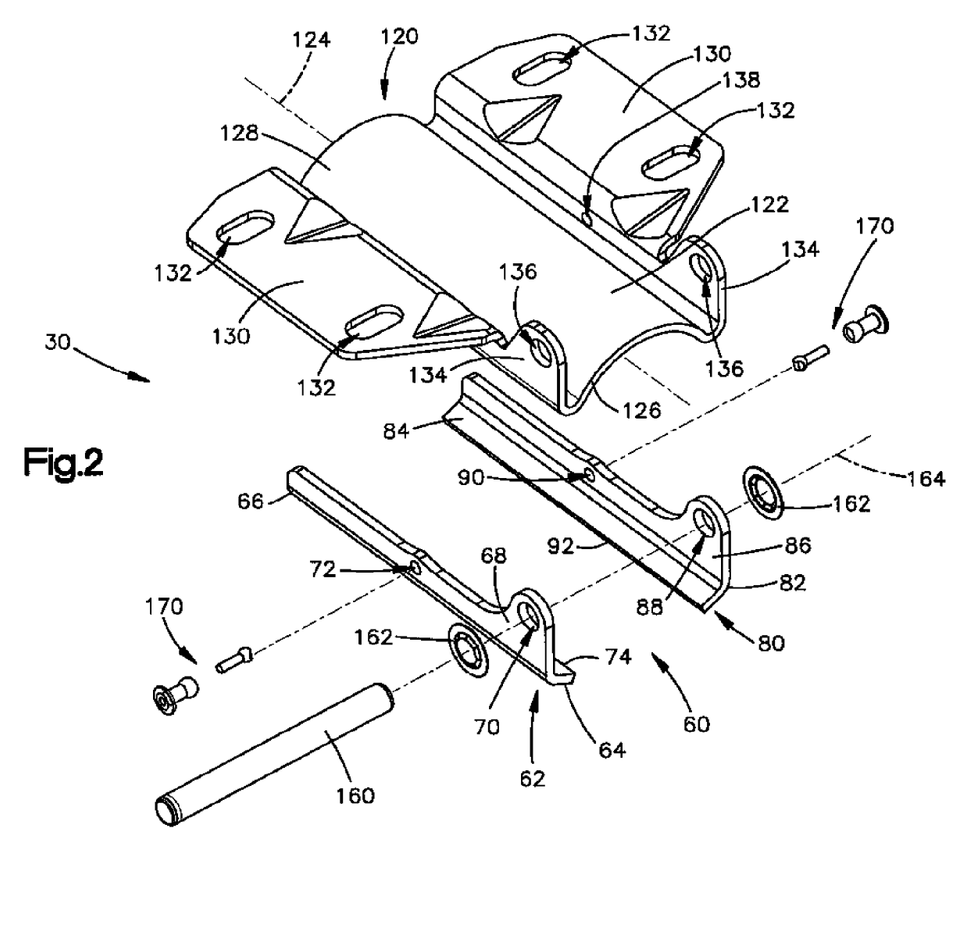
FIG. 2 is an exploded assembly view of the mounting assembly of FIG. 1.

As shown in FIG. 2, the mounting assembly 30 includes a first bracket 60, a second bracket 120, and a pivot shaft 160 for pivotably connecting the first bracket to the second bracket. The first bracket 60 is configured to be secured to the steering column 40 and includes a first portion 62 and a second portion 80. The first bracket 60 may, for example, be welded directly to the steering column 40 or may be secured to the steering column using fasteners or the like (not shown). The first bracket 60 includes substantially identical first and second portions 62, 80. The first and second portions 62, 80 may be separate pieces or may be integrally formed or connected with one another (not shown). In any case, the first and second portions 62, 80 may be formed from a high strength, corrosion resistant material, such as metal.

The first portion 62 has an elongated shape and extends from a first end 64 to a second end 66. One or more openings 72 are positioned between the first end 64 and the second end 66 and extend entirely through the first portion 62. Although a single opening 72 is illustrated in FIG. 2, those having ordinary skill will appreciate that more openings may be provided in the first portion 62. A projection 68 extends from the first end 64 of the first portion 62 and includes an opening 70 that extends entirely through the first end. The opening 70 is sized and shaped to receive an end of the pivot shaft 160 for pivotably connecting the first portion 62 of the first bracket 60 to the second bracket 120. The first portion 62 further includes a lower edge 74 that extends the length of the first portion. The lower edge 74 may be angled or may be co-planar (not shown) with the remainder of the first portion 62.

The second portion 80 has an elongated shape and extends from a first end 82 to a second end 84. The second portion 80 includes one or more openings 90 positioned between the first end 82 and the second end 84. Although a single opening 90 is illustrated in FIG. 2, those having ordinary skill will appreciate that more or fewer openings may be provided in the second portion 80. The size, shape, and position of the openings 90 in the second portion 80 may correspond with or be different from the size, shape, and position of the openings 72 in the first portion 62. A projection 86 extends from the first end 82 of the second portion 80 and includes an opening 88 that extends entirely through the first end. The opening 88 in the second portion 80 is sized and shaped to receive an end of the pivot shaft 160 for pivotably connecting the second portion of the first bracket 60 to the second bracket 120. The second portion 80 further includes a lower edge 92 that extends the length of the second portion. The lower edge 92 may be angled or may be co-planar (not shown) with the remainder of the second portion 80.

The second bracket 120 extends along an axis 124. The second bracket 120 is made of a high strength, corrosion resistant material, such as metal. The second bracket 120 includes a base 122 that extends from a first end 126 to a second end 128. The base 122 has a generally arcuate shape that may conform to a portion of the steering column 40 to allow the base to overlay a portion of the steering column. In particular, the base 122 may have a generally W-shaped configuration that mimics the contour of a particular steering column 40 on which the mounting assembly 30 is used. The base 122 includes one or more openings 138 positioned between the first end 126 and the second end 128 on one or both sides of the base 122. The size, shape, number, and position of the openings 138 in the base 122 on one side of the base i.e., the left side as viewed in FIG. 2, correspond with the size, shape, number, and position of the openings 72 in the first portion 62 of the first bracket 60. Likewise, the size, shape, number, and position of the openings 138 in the base 122 on the other side of the base 122, i.e., the right side as viewed in FIG. 2, correspond with the size, shape, number, and position of the openings 90 in the second portion 80 of the first bracket 60. Therefore, if either the first portion 62 or the second portion 80 of the first bracket 60 does not include openings 72 or 90, then no corresponding openings 138 are provided in the base 122. A flange 130 extends transversely from each side of the base 122.

The flanges 130 may extend substantially parallel to one another or may extend at an angle relative to one another (not shown). Each flange 130 has a planar shape and includes one or more openings 132 that extend entirely through the flange. The openings 132 are sized and shaped to receive fasteners (not shown) to secure the second bracket 120 to a portion of the vehicle 50. Although four openings 132 are shown in FIG. 2, those having ordinary skill in the art will appreciate that more or fewer openings may be provided in the second bracket 120 depending on the construction of the portion of the vehicle 50 to which the second bracket is secured.

Projections 134 extend from the first end 126 of the base 122. The projections 134 extend away from the base 122. Each projection 134 includes an opening 136 that is sized and shaped similar to the openings 70, 88 in the first and second portions 62 and 80, respectively, of the first bracket 60. The openings 136 are axially aligned with one another and receive opposing ends of the pivot shaft 160 for pivotably connecting the first bracket 60 to the second bracket 120.

When the mounting assembly 30 is fully assembled, the first bracket 60 is secured to the steering column 40 and the second bracket 120 is secured to a portion of the vehicle 50. In particular, the lower edges 64, 92 of the first and second portions 62 and 80, respectively, of the first bracket 60 are welded directly to the steering column 40. Alternatively, the first and second portions 62, 80 of the first bracket 60 may be secured to the steering column 40 via fasteners or the like (not shown). A plurality of fasteners (not shown) extends through the openings 132 in the flanges 130 of the second bracket 120 to secure the second bracket to the vehicle 50. The base 122 of the second bracket 120 is positioned between the first and second portions 62, 80 of the first bracket 60 such that the first end 126 of the second bracket 120 is aligned with the first ends 64, 82 of the first and second portions 62 and 80, respectively, of the first bracket 60. The first and second portions 62, 80 of the first bracket 60 extend parallel to the base 122 of the second bracket 120 and are positioned beneath the flanges 130 on the second bracket.

In this configuration, the openings 136 in the projections 134 of the second bracket 120 are aligned with the openings 70, 88 in the projections 68, 86 of the first and second portions 62 and 80, respectively, of the first bracket 60. The openings 70, 88, 136 receive the pivot shaft 160 to pivotably connect the first bracket 60 to the second bracket 120 about an axis 164 of the pivot shaft, thereby pivotably connecting the steering column 40 mounted on the first bracket to the vehicle 50 secured to the second bracket. A pair of lock washers 162 engages the ends of the pivot shaft 160 to prevent the pivot shaft from exiting the openings 70, 88, 136.

Each opening 72 in the first portion 62 of the first bracket 60 is aligned with an opening 138 in the left side of the base 122 of the second bracket 120, and each opening 90 in the second portion 80 of the first bracket is aligned with an opening 138 in the right side of the base of the second bracket. Each pair of aligned openings 72, 138 on the left side of the mounting assembly 30 and each pair of aligned openings 90, 138 on the right side of the mounting assembly receives a holding element 170, such as a rivet or pin. The holding elements 170 may constitute blind rivets, pins, rods or the like and be made of, for example, metal. In particular, the holding elements 170 may be made of C1006-C1038 steel, high strength steel, 1025 low carbon steel, leaded brass wire, copper wire, and combinations thereof. Collectively, the holding elements 170 act to secure the second bracket 120 to the first bracket 60 such that pivotal movement of the first bracket relative to the second bracket and about the axis 164 of the pivot shaft 160 is blocked unless or until predetermined conditions are met.

Although the holding elements 170 are illustrated and described as being metal elements that are sheared or ruptured, those having ordinary skill will appreciate that the holding elements 170 may have alternative configurations that block pivotal movement of the first bracket 60 relative to the second bracket 120 until or unless predetermined conditions are met. For example, the holding elements 170 may constitute biasing members, such as springs, cams, wedges, frictional or magnetic members or the like, or combinations thereof.

During normal operation of the vehicle 50 (FIG. 3A), the axis 44 of the steering shaft 45 is substantially co-axial with or parallel to the fore-aft direction 46 of the vehicle. In this condition, the holding elements 170 block pivotal movement of the first bracket 60 relative to the second bracket 120 and thus, the holding elements block the steering column 40 mounted on the first bracket from pivoting relative to the portion of the vehicle 50 secured to the second bracket.

During a vehicle crash or other situation in which the legs or lower torso of the occupant are forced upwards towards the underside of the steering column 40 or steering wheel 42, e.g., detonation of an explosive device underneath the vehicle, the occupant impacts the steering column and/or steering wheel with an upward force indicated at arrow F. Since the point at which the occupant impacts the steering column 40 is spaced from the pivot shaft 160 along the steering axis 44, the impact creates a counterclockwise moment, as viewed in FIG. 3A, about the axis 164 of the pivot shaft that tends to urge the steering column 40 to pivot in an upward direction away from the occupant and towards the instrument panel (not shown).

Figure 3A:
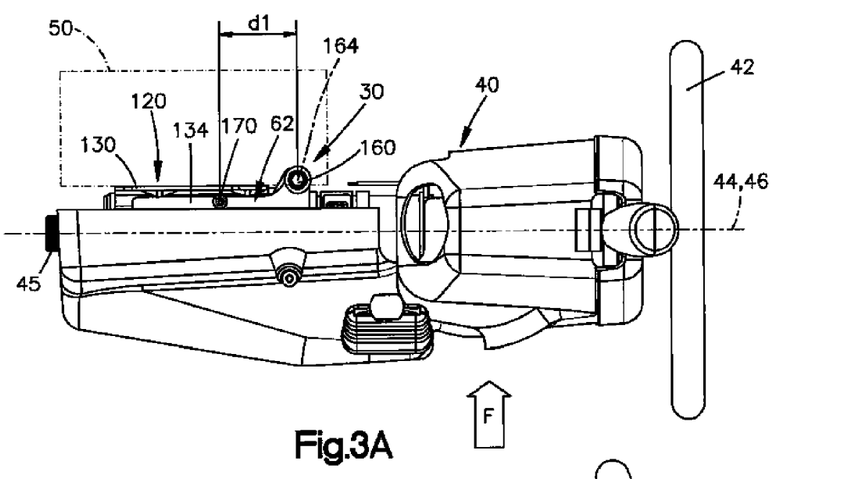
FIG. 3A is a side view of the steering column of FIG. 1 when the mounting assembly is in a first condition.

Pivotal movement of the steering column 40 about the pivot shaft 160 and relative to the vehicle 50 is initially blocked due to the opposing reaction moment on the other side of the pivot shaft of the rigid connection between the holding elements 170 and the first and second brackets 60, 120. The holding elements 170 are configured such that if the amount of force F applied to the steering column 40 by the upwardly moving occupant exceeds a predetermined amount, the holding elements will shear or rupture. In other words, if the force F of the occupant impacting the steering column 40 exceeds a predetermined amount, the holding elements 170 will fail, thereby releasing the secure connection between the first bracket 60 and the second bracket 120 and eliminating the reaction moment opposing pivotal movement of the first bracket relative to the second bracket. This allows the first bracket 60 to pivot relative to the second bracket 120 and, thus, allows the steering column 40 to pivot relative to the vehicle 50 and towards the instrument panel.

Figure 3B:
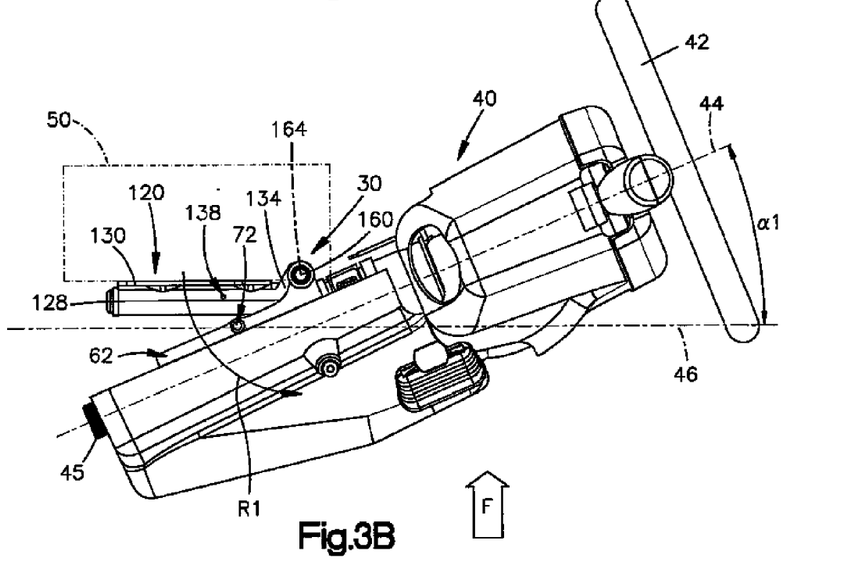
FIG. 3B is a side view of the steering column of FIG. 1 when the mounting assembly is in a second condition.
Figure 4:
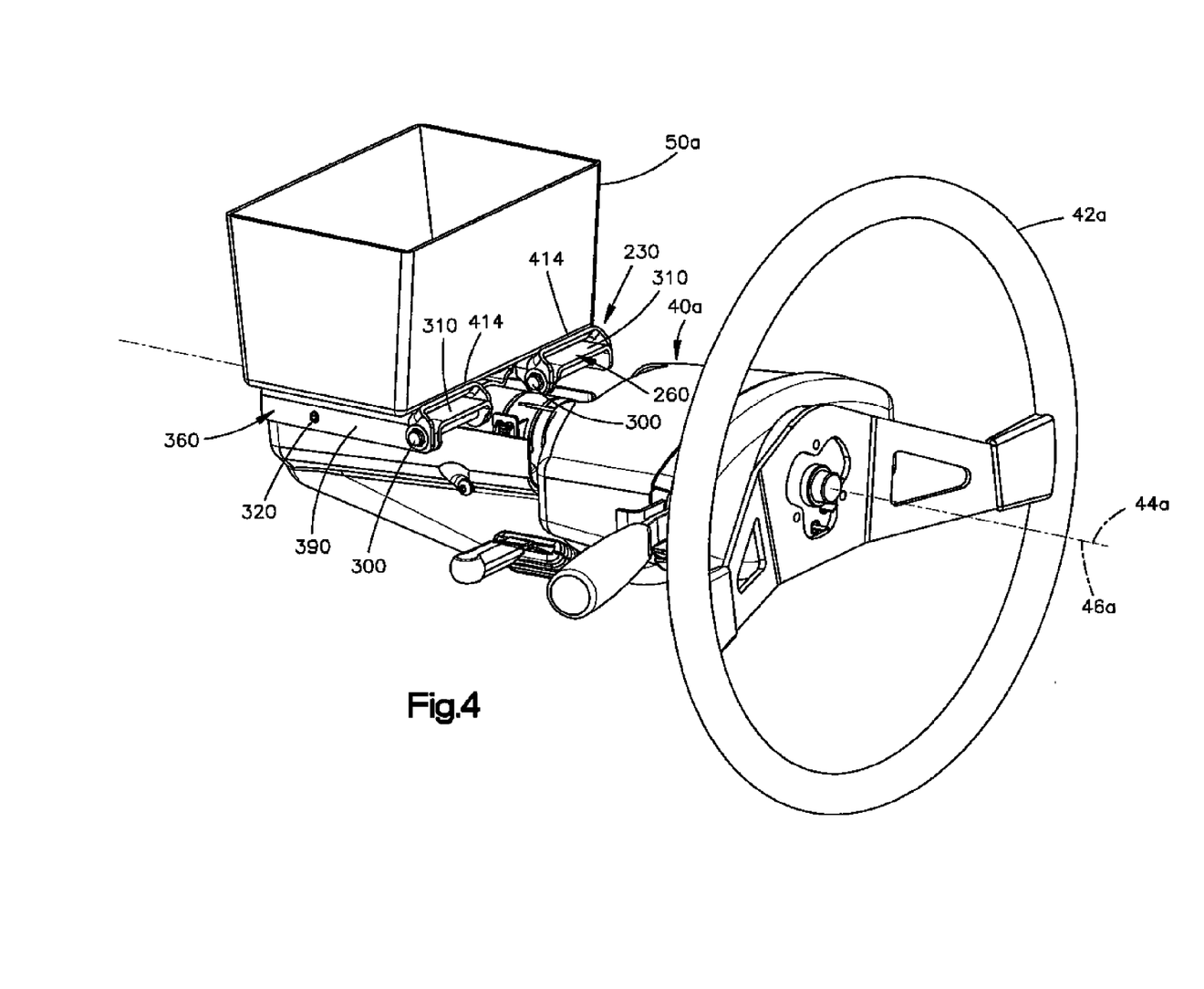
FIG. 4 is a schematic illustration of a mounting assembly for a steering column in accordance with another embodiment of the present invention.

Since the moving occupant continues to exert an upward force F upon the steering column 40 after the holding elements 170 fail, the steering column pivots about the pivot shaft 160 in a counterclockwise direction as indicated at R1 and relative to the vehicle 50 towards the instrument panel. The axis 44 of the steering shaft 45 is thereby placed at an angle, indicated by $\alpha_1$, relative to the axis 46 representing the fore-aft direction of the vehicle 50. Pivotal movement of the steering column 40 relative to the vehicle 50 and towards the instrument panel allows the steering column to move upwards with the moving occupant, thereby lowering reaction forces between the steering column and the occupant.

The amount of predetermined force required to sever or release the secure holding element 170 connections between the first bracket 60 and the second bracket 120 may be adjusted to meet desired performance criterion. For instance, the size, number, and shear strength of the holding elements 170 may all be adjusted to raise or lower the amount of predetermined force required to cause failure of the holding elements to release the secure connection between the first bracket 60 and the second bracket 120. Furthermore, the position of the holding elements 170 relative to the pivot shaft 160 may also be adjusted. In particular, as shown in FIG. 3A, the single holding element 170 that extends through the first portion 62 of the first bracket 60 and the second bracket 120 is spaced from the axis 164 of the pivot shaft 160 by a distance indicated by d1. By increasing or decreasing the distance d1, the reaction moment of the connection between the holding element 170 and the brackets 60, 120 that opposes the moment created by the moving occupant impacting the steering column 40 or steering wheel 42 can likewise be increased or decreased.

More specifically, increasing the distance d1 creates a greater reaction moment at the holding element 170 connection, which thereby requires a greater impact force F by the occupant to cause failure of the holding element 170. On the other hand, decreasing the distance d1 creates a lesser reaction moment at the holding element 170 connection, thereby requiring a lesser impact force F by the occupant to cause failure of the holding element. Although the spacing of a single holding element 170 relative to the pivot shaft 160 is discussed for simplicity and brevity, those skilled in the art will appreciate that similar considerations are applicable for each of the holding elements in the mounting assembly 30.

It will be appreciated by those skilled in the art that the spacing of multiple holding elements 170 along the mounting assembly 30 may be symmetric or asymmetric along the length of the mounting assembly to specifically tailor the threshold amount of force F required to cause failure of the holding elements. Accordingly, the spacing of the openings 72, 90 in the first and second portions 62 and 80, respectively, of the first bracket 60 and the openings 138 in the second bracket 120 may be symmetric or asymmetric along the length of the mounting assembly 30 so long as the openings are aligned to allow the holding elements 170 to block pivotal movement of the first bracket relative to the second bracket.

A mounting assembly in accordance with another aspect of the present invention is illustrated in FIGS. 4-8B. Features in FIGS. 4-8B that are similar to features in FIGS. 1-3 are given the suffix "a". The mounting assembly 230 in FIGS. 4-8B includes a first bracket 260, a second bracket 360, and a pair of pivot shafts 300 for pivotably connecting the first bracket to the second bracket. The first bracket 260 is configured to be secured to the steering column 40a and the second bracket 360 is configured to be secured to a portion of the vehicle 50a, such as the instrument panel.

Figure 5:
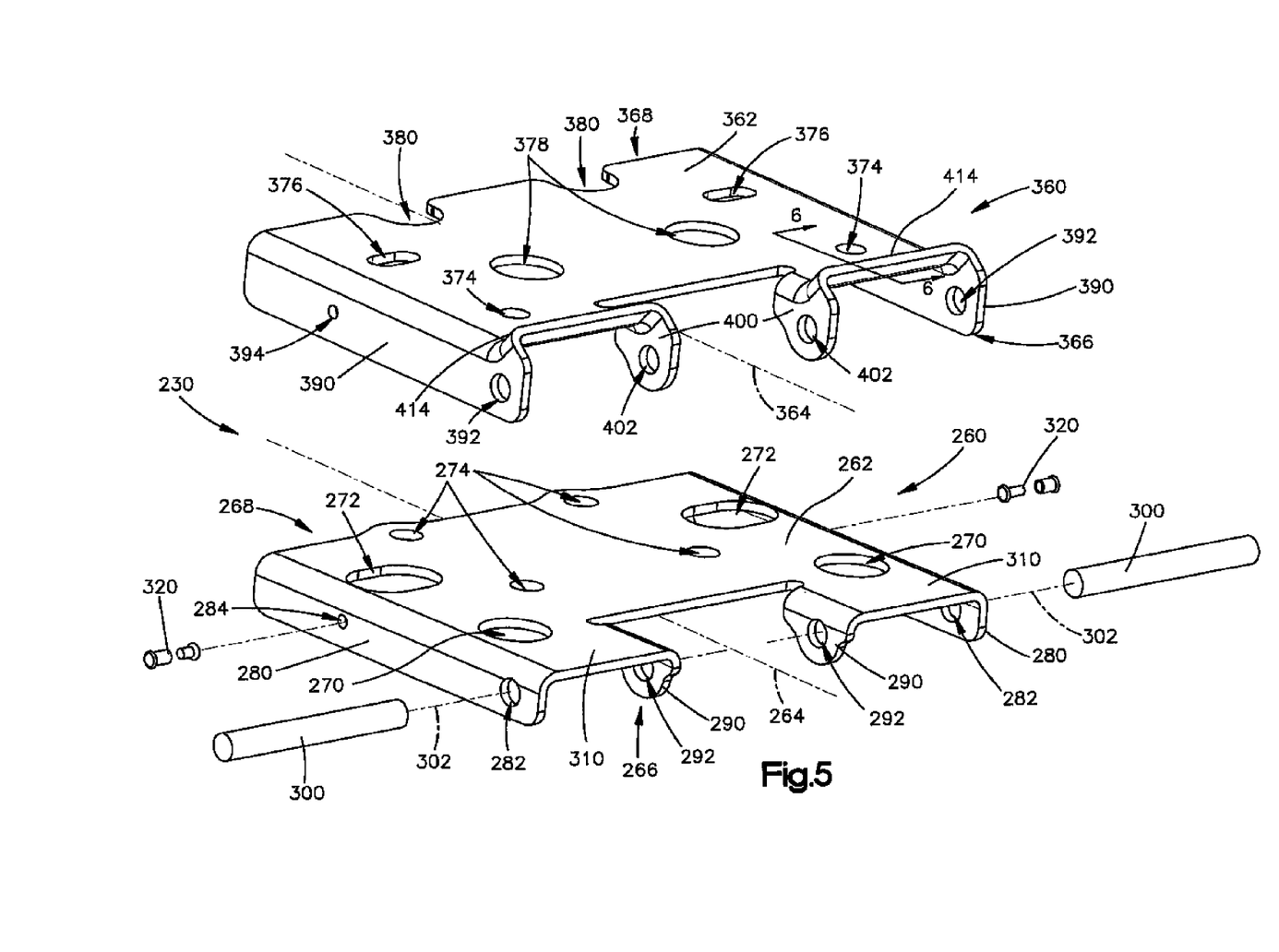
FIG. 5 is an exploded assembly view of the mounting assembly of FIG. 4.
Figures 6, 7:
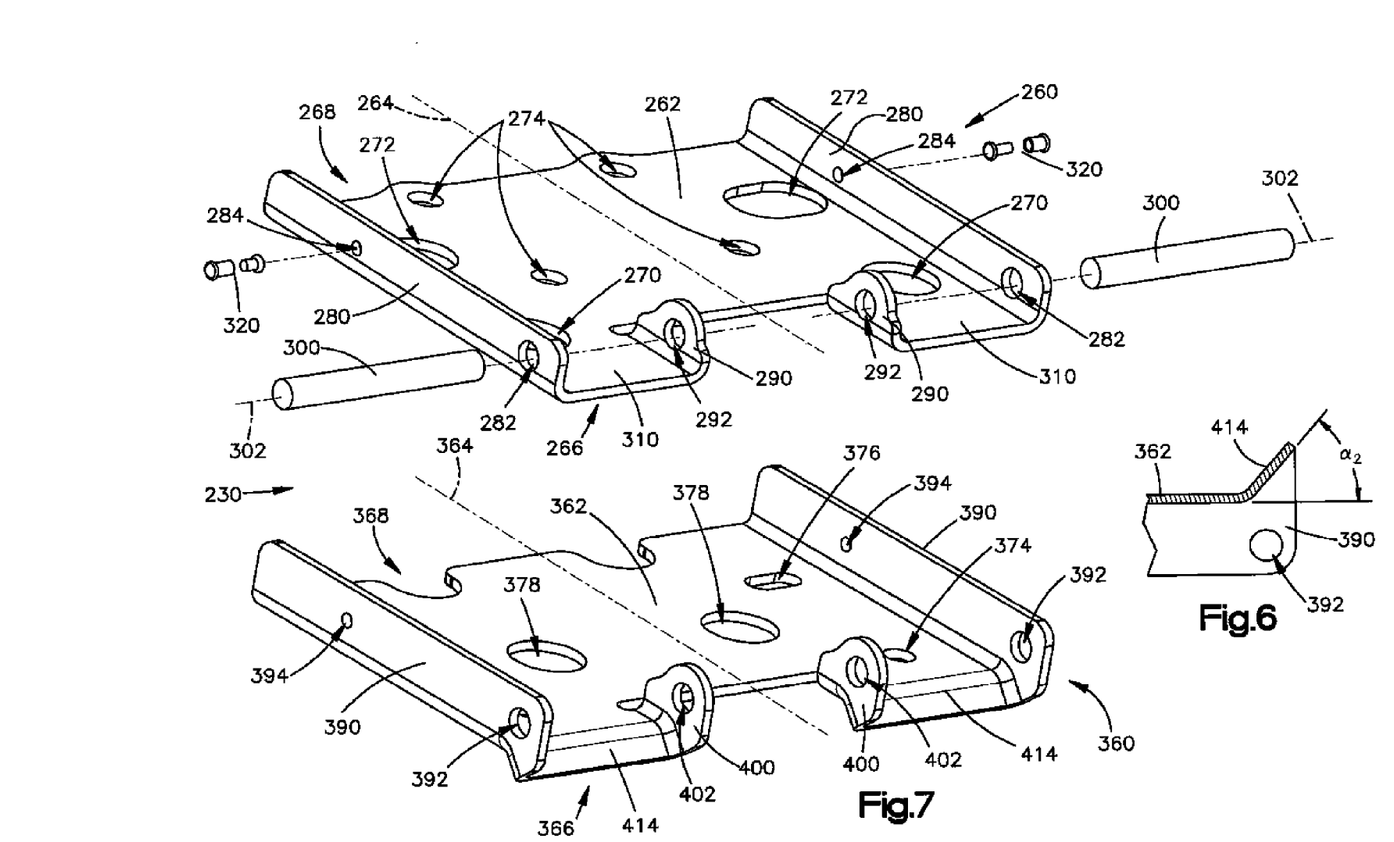
FIG. 6 is an enlarged view of a portion of the mounting assembly of FIG. 5.
FIG. 7 is a bottom view of FIG. 5.

As shown in FIGS. 5-7, the first bracket 260 includes a base 262 that extends along an axis 264 from a first end 266 to a second end 268. The first bracket 260 may be formed from a high strength, corrosion resistant material, such as metal. A series of first openings 270 and second openings 272 extend through the base 262 of the first bracket 260. The first and second openings 270, 272 are sized and shaped to act as pass-through openings for fasteners (not shown) that connect the second bracket 360 to the vehicle 50a. A series of third openings 274 also extend through the base 262 of the first bracket 260. The third openings 274 are sized and shaped to receive fasteners (not shown) to secure the first bracket 260 to the steering column 40a. Although FIG. 5 illustrates a pair of each of the first, second, and third openings 270, 272, 274, those having ordinary skill will appreciate that more or fewer first, second, and third openings may be provided in the base to meet desired mounting criterion.

Side walls 280 extend from each side of the base 262 such that the side walls extend substantially parallel to one another. An opening 282 extends entirely through each side wall 280 at the first end 266 of the base 262. The openings 282 are axially aligned with one another and are sized and shaped to receive an end of each pivot shaft 300 for pivotably connecting the first bracket 260 to the second bracket 360. One or more additional openings 284 extend through each side wall 280 between the first end 266 and the second end 268 of the base 262. Although FIG. 5 illustrates a single opening 284 in each side wall 280, those having ordinary skill will appreciate that more openings may be provided in either or both of the side walls.

Secondary walls 290 extend from the first end 266 of the base 262. Each secondary wall 290 is positioned inward of each respective side wall 280 such that the secondary walls are spaced closer together than the side walls 280. The secondary walls 290 and the side walls 280 extend substantially parallel to one another. An opening 292 extends entirely through each secondary wall 290 at the first end 266 of the base 262. The openings 292 are axially aligned with one another and with the openings 282 in the side wall 280. The openings 292 are sized and shaped to receive an end of each pivot shaft 300 for pivotably connecting the first bracket 260 to the second bracket 360. Although FIG. 5 illustrates that each pair of openings 282, 292 receives an end of separate pivot shafts 300, those having ordinary skill will appreciate that a single pivot shaft may extend through all four openings in accordance with the present invention.

The second bracket 360 is substantially similar to the first bracket 260 and includes a base 362 that extends along an axis 364 from a first end 366 to a second end 368. The second bracket 360 may be formed from a high strength, corrosion resistant material, such as metal. A series of first and second openings 374, 376 extend through the base 362 of the second bracket 360. The first and second openings 374, 376 are sized and shaped to receive fasteners (not shown) to secure the second bracket 360 to the vehicle 50a. A series of third recesses or openings 378 and fourth openings 380 also extend through the base 362 of the second bracket 360. The third and fourth openings 378, 380 are sized and shaped to act as pass-through openings for fasteners (not shown) that connect the first bracket 260 to the steering column 40a. Although FIG. 5 illustrates a pair of each of the first, second, third, and fourth openings 374, 376, 378, 380, those having ordinary skill will appreciate that more or fewer first, second, third, and fourth openings may be provided in the base to meet desired mounting criterion.

A side wall 390 extends on each side of the base 362 such that the side walls extend substantially parallel to one another. An opening 392 extends entirely through each side wall 390 at the first end 366 of the base 362. The openings 392 are axially aligned with one another and are sized and shaped to receive an end of each pivot shaft 300 for pivotably connecting the first bracket 260 to the second bracket 360. One or more additional openings 394 extend through each side wall 390 between the first end 366 and the second end 368 of the base 362. Although a single opening 394 is illustrated in each side wall 390 in FIG. 5, those having ordinary skill will appreciate that more or fewer openings may be provided in either or both of the side walls. The size, number, shape, and position of the openings 394 on one side of the base 362, i.e., the left side as viewed in FIG. 5, of the second bracket 360 are configured to correspond with the size, number, shape, and position of the openings 284 on the left side of the first bracket 260. Likewise, the size, number, shape, and position of the openings 394 on the other side of the base 362, i.e., the right side as viewed in FIG. 5, of the second bracket 360 are configured to correspond with the size, number, shape, and position of the openings 284 on the right side of the first bracket 260.

Secondary walls 400 extend from the first end 366 of the base 362. Each secondary wall 400 is positioned inward of each respective side wall 390 such that the secondary walls are spaced closer together than the side walls. The secondary walls 400 and the side walls 390 extend substantially parallel to one another. An opening 402 extends entirely through each secondary wall 400. The openings 402 are axially aligned with one another and with the openings 392 in the side wall 390. The openings 402 are sized and shaped to receive an end of each pivot shaft 300 for pivotably connecting the first bracket 260 to the second bracket 360. Although FIG. 5 illustrates that each pair of openings 392, 402 receives a pivot shaft 300, those having ordinary skill will appreciate that a single pivot shaft may extend through all four openings in accordance with the present invention.

An extension 414 extends from and between each pair of walls 390, 400. As shown in FIG. 6, each extension extends at an angle, indicated by $\alpha_2$, relative to the base 360. The angle $\alpha_2$ may be in the range of about 0° to about 90°. In particular, the angle $\alpha_2$ may be about 50°. In any case, the extensions 414 have the same angle $\alpha_2$ and, thus, extend substantially parallel to one another.

When the mounting assembly 230 is fully assembled, the first bracket 260 is secured to the steering column 40a and the second bracket 360 is secured to a portion of the vehicle 50a. In particular, a plurality of fasteners (not shown) extends through the third openings 374 in the first bracket 260 to secure the first bracket to the steering column 40a. A plurality of fasteners (not shown) also extends through the first and second openings 374, 376 in the second bracket 360 to secure the second bracket to the vehicle 50a. The second bracket 360 is then positioned overlying the first bracket 260 such that the openings 392, 402 in the walls 390, 400 of the second bracket 360 are aligned with the openings 282, 292 in the walls 280, 290 of the first bracket 260.

The openings 282, 292, 392, 402 on one side of the mounting assembly 230, i.e., the left side as viewed in FIG. 5, receive the ends of one pivot shaft 300 to pivotally secure the left side of the first bracket 260 to the second bracket 360 about an axis 302. Likewise, the openings 282, 292, 392, 402 on the other side of the mounting assembly 230, i.e., the right side as viewed in FIG. 5, receive the ends of another pivot shaft 300 to pivotally secure the right side of the first bracket 260 to the second bracket 360 about an axis 302. In combination, the pivot shafts 300 pivotally connect the steering column 40a mounted on the first bracket 260 to the portion of the vehicle 50a secured to the second bracket 360. A pair of lock washers (not shown) engages the ends of each pivot shaft 300 to prevent the pivot shafts from exiting the openings 282, 292, 392, 402.

Each opening 284 in the side walls 280 of the first bracket 260 is aligned with an opening 394 in the side wall 390 of the second bracket 360. Each pair of aligned openings 284, 394 on both sides of the mounting assembly 230 receives a holding element 320 that is similar or identical to the holding element 170 used in the mounting assembly 30 of FIGS. 1-3B. Collectively, the holding elements 320 act to secure the second bracket 360 to the first bracket 260 such that pivotal movement of the first bracket relative to the second bracket and about the axes 302 of the pivot shafts 300 is blocked unless or until predetermined conditions are met.

When the first and second brackets 260, 360 are secured to one another in this manner, the first and second openings 270, 272 in the first bracket are aligned with the first and second openings 374, 376, respectively, in the second bracket. As noted, fasteners (not shown) extend through the first and second openings 374, 376 in the second bracket 360 to secure the second bracket to the portion of the vehicle 50a. The first and second openings 270, 272 in the first bracket 260 are sized and shaped to accommodate any portion of the fasteners that extends through the first and second openings 374, 376 in the second bracket and towards the first bracket such that the fasteners do not interfere with the operation of the mounting assembly 230.

Likewise, when the first and second brackets 260, 360 are secured to one another, the third openings 274 in the first bracket are aligned with the third and fourth openings 378, 380, respectively, in the second bracket. As noted, fasteners (not shown) extend through the third openings 274 in the first bracket 260 to secure the first bracket to the steering column 40a. The third and fourth openings 278, 280 in the second bracket 360 are sized and shaped to accommodate any portion of the fasteners that extends through the third openings 274 in the first bracket and towards the second bracket such that the fasteners do not interfere with the operation of the mounting assembly 230.

During normal operation of the vehicle (FIG. 8A), the axis 44 of the steering shaft 45 is substantially co-axial with or parallel to the fore-aft direction 46a of the vehicle 50a. In this condition, the holding elements 320 block pivotal movement of the first bracket 260 relative to the second bracket 360 and, thus, the holding elements block the steering column 40a mounted on the first bracket from pivoting relative to the vehicle 50a secured to the second bracket.

During a vehicle crash or other situation in which the legs or lower torso of the occupant are forced upwards towards the underside of the steering column 40a or steering wheel 42a, e.g., detonation of an explosive device underneath the vehicle, the occupant impacts the steering column and/or steering wheel with an upward force indicated at F. Since the point at which the occupant impacts the steering column 40a is spaced from the pivot shafts 300 along the steering axis 44a, the impact creates a counterclockwise moment, as viewed in FIG. 8A, about the axes 302 of the pivot shafts that tends to urge the steering column to pivot in an upward direction away from the occupant and towards the instrument panel.

Figure 8A:
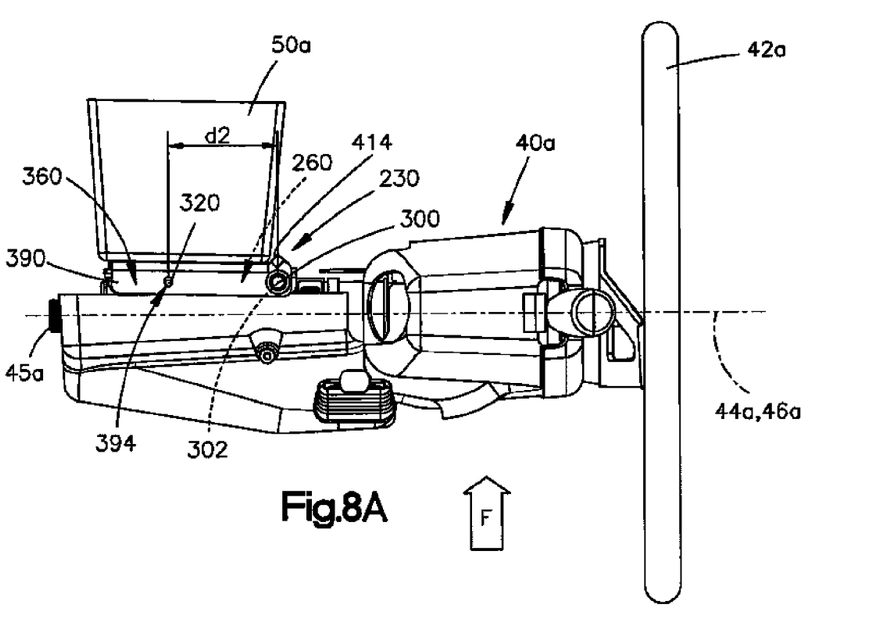
FIG. 8A is a side view of the steering column of FIG. 4 when the mounting assembly is in a first condition.

Pivotal movement of the steering column 40a about the pivot shafts 302 and relative to the vehicle 50a is initially blocked due to the opposing reaction moment on the other side of the pivot shafts of the rigid connection between the holding elements 320 and the first and second brackets 260, 360. The holding elements 320 are configured such that if the amount of force F applied to the steering column 40a by the upwardly moving occupant exceeds a predetermined amount, the holding elements will shear or rupture. In other words, if the force F of the occupant impacting the steering column 40a exceeds a predetermined amount, the holding elements 320 will fail, thereby releasing the secure connection between the first bracket 260 and the second bracket 360, and eliminating the reaction moment opposing pivotal movement of the first bracket relative to the second bracket. This allows the first bracket 260 to pivot relative to the second bracket 360 and, thus, allows the steering column 40a to pivot relative to the vehicle 50a and towards the instrument panel.

Figure 8B:
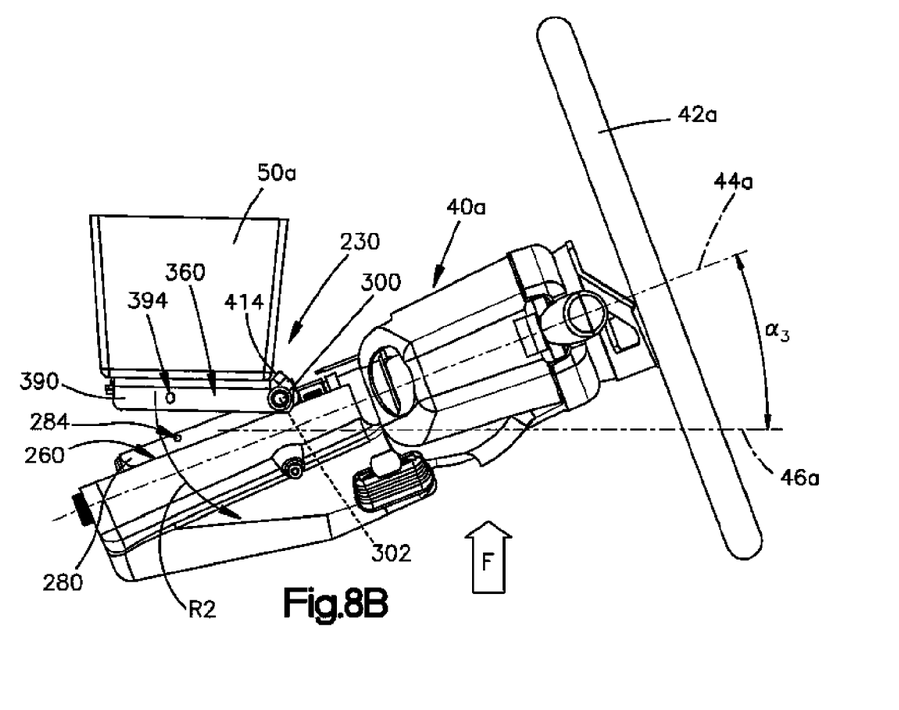
FIG. 8B is a side view of the steering column of FIG. 4 when the mounting assembly is in a second condition.

Since the moving occupant continues to exert an upward force F upon the steering column 40a after the holding elements 320 fail, the steering column pivots about the pivot shafts 300 in a counterclockwise direction as indicated at R2 and relative to the vehicle 50a. The axis 44a of the steering shaft 45a is thereby placed at an angle, indicated at $\alpha_3$, relative to the axis 46a representing the fore-aft direction of the vehicle 50a. Pivotal movement of the steering column 40a relative to the vehicle 50a and towards the instrument panel allows the steering column to move upwards with the moving occupant, thereby lowering reaction forces between the steering column and the occupant.

In the mounting assembly 230 of FIGS. 5-8B, pivotal movement of the first bracket 260 relative to the second bracket 360 and, thus, of the steering column 40a relative to the portion of the vehicle 50a is regulated. In particular, the extensions 414 on the second bracket 360 act as stops to prevent the first bracket 260 from pivoting relative to the second bracket 360 in the counterclockwise direction R2 more than a predetermined amount. Before the holding elements 320 fail, the base 262 of the first bracket 260 extends substantially parallel to the base 362 of the second bracket 360. Since the extensions 414 on the second bracket 360 extend at an angle $\alpha_2$ relative to the base 362, the extensions likewise extend at the angle $\alpha_2$ relative to the base 262 of the first bracket 260. In other words, prior to failure of the holding elements 320, the projections 310 of the base 262, are angularly offset from the extensions 414 on the second bracket 360 by the angle $\alpha_2$.

Following failure of the holding elements 320 due to the impact between the occupant and the steering column 40a, the first bracket 260 pivots with the moving steering column 40a and relative to the second bracket 360 in the counterclockwise direction R2. Therefore, the projections 310 on the first bracket 260 pivot relative to the extensions 414 on the second bracket 360. Pivoting of the first bracket 260 relative to the second bracket 360 is thereby permitted over the entire angle $\alpha_2$ until the extensions 310 on the first bracket engage the projections 414 on the second bracket, thereby ceasing relative pivotal movement between the steering column 40a and the vehicle 50a. By adjusting the angle $\alpha_2$ of the projections 414 on the second bracket 360, the amount of pivotal movement of the steering column 40a relative to the vehicle 50a, i.e., the degree of the angle $\alpha_2$, can be limited to a predetermined amount to meet specific design criterion.

Similar to the mounting assembly 30 illustrated in FIGS. 1-3B, the amount of predetermined force required to release the secure holding element 320 connections between the first bracket 260 and the second bracket 360 in the mounting assembly 230 of FIGS. 5-8B may be adjusted to meet desired performance criterion. For instance, the size, number, and shear strength of the holding elements 320 may all be adjusted to raise or lower the amount of predetermined force required to cause failure of the holding elements 320 to release the secure connection between the first bracket 260 and the second bracket 360. Furthermore, the distance, indicated by d2 in FIG. 8A, of one or more of the holding elements 320 relative to the pivot shafts 300 may also be adjusted. It will be appreciated by those skilled in the art that the spacing of the holding elements 320 along the mounting assembly 230 may be symmetric or asymmetric along the length of the mounting assembly. Accordingly, the spacing of the openings 284, 394 in the first bracket 260 and the second bracket 360 may be symmetric or asymmetric along the length of the mounting assembly 230 so long as the openings are aligned to allow the holding elements 320 to block pivotal movement of the first bracket relative to the second bracket.

Due to the configuration of the mounting assemblies 30, 230 of the present invention, the steering column 40, 40a is only pivotable relative to the vehicle 50, 50a when the occupant impacts the underside of the steering column or steering wheel 42, 42a. Therefore, any forces or impact applied in a downward manner to the steering column 40, 40a or steering wheel 42, 42a do not result in pivotal movement of the steering column relative to the vehicle 50, 50a. In other words, forces applied in a downward manner upon the steering column 40, 40a or steering wheel 42, 42a that impart a clockwise moment to the steering column about the axis 164, 302, e.g., during ingress or egress from the vehicle when the occupant steps on or otherwise applies downward forces to the steering column, do not cause the holding elements 170, 320 to fail. Therefore, the first bracket 60, 260 remains blocked from pivoting relative to the second bracket 120, 360, respectively. This is due to the supplemental reaction moment from the steering column 40, 40a being urged against the vehicle 50, 50a that opposes the clockwise moment of the occupant applying downward forces to the steering column. The combination of reaction moments from the mounting assembly 30, 230 and the steering column 40, 40a is far greater than the opposing moment of the occupant applying downward forces to the steering column such that the holding elements 170, 320 do not fail during vehicle egress and ingress.

If a downward force is applied to the steering column 40, 40a in a direction opposite to the direction of the force F, the holding elements 170, 320 will not shear or rupture. The first bracket 60, 260 is urged into engagement with the second bracket 120, 360 to prevent pivotal movement of the brackets relative to each other. Accordingly, a vehicle occupant may step on the steering column 40, 40a upon entering or leaving the vehicle without shearing or rupturing the holding elements 170, 320.

Figure 9A:
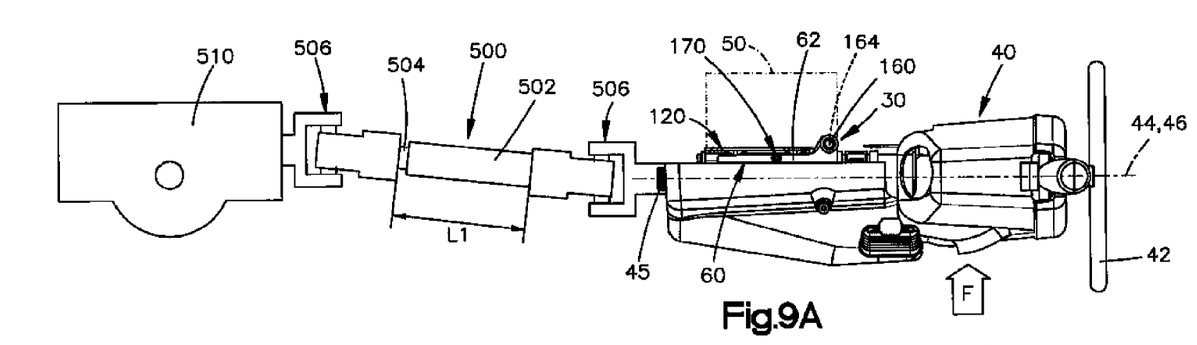
FIG. 9A is a schematic illustration of a mounting assembly in a first condition for use with a telescoping device.
Figure 9B:
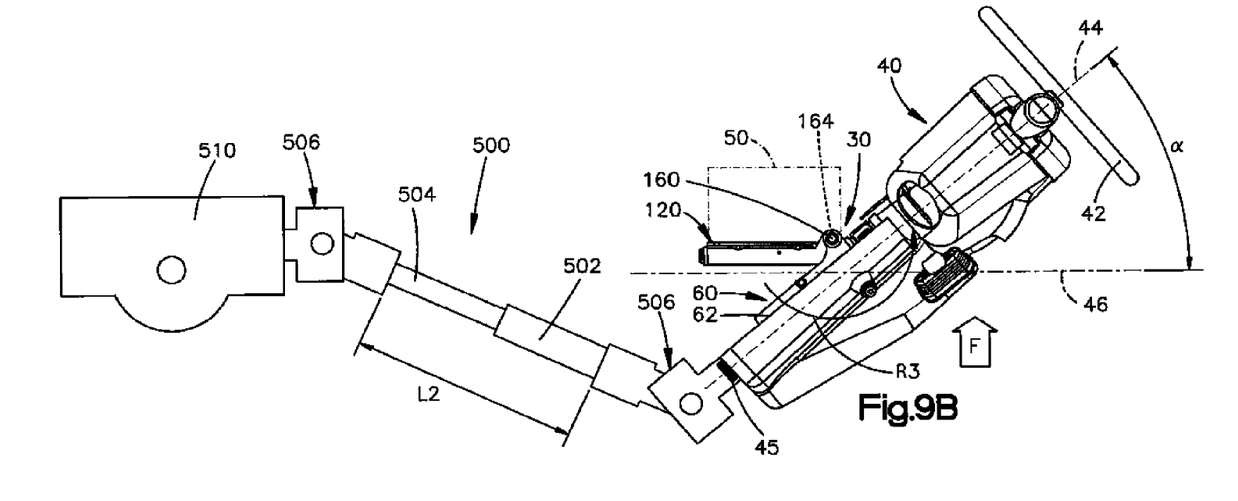
FIG. 9B is a side view of the mounting assembly of FIG. 9A in a second condition.

In another aspect of the present invention illustrated in FIGS. 9A-9B, either of the mounting assemblies 30, 230 of the present invention may be used in combination with a telescoping device 500 that is secured to a steering gear 510. Although FIGS. 9A-9B illustrate the mounting assembly 30 and steering column 40 of FIGS. 1-5, the mounting assembly 230 and steering column 40a of FIGS. 5-8B could likewise be used in accordance with the telescoping device 500. In FIGS. 9A-9B, features that are similar to those used in FIGS. 1-8B use the same reference number.

In FIG. 9A, the mounting assembly 30 secures the steering column 40 to a portion of the vehicle 50, such as the instrument panel. The mounting assembly 30 is in an initial condition in which the holding elements 170 prevent the steering column 40 from pivoting relative to the vehicle 50. The telescoping device 500 mechanically connects the steering shaft 45 of the steering column 40 to the steering gear 510 for helping to steer the vehicle wheels via the steering wheel 42. The telescoping device 500 may include first and second members 502, 504 that mechanically connect the steering shaft 45 to the steering gear 510 such that rotation of the steering wheel 42 is transferred through the steering shaft and to the steering gear.

The first and second members 502, 504 of the telescoping device 500 may be mounted within one another to allow for relative axial movement between the first and second members while preventing relative rotational movement between the first and second members. In this configuration, the telescoping device 500 accounts for changes in the distance between the steering shaft 45 and the steering gear 510 while maintaining the ability to transfer rotational movement of the steering shaft to the steering gear. In particular, the telescoping device 500 is secured to both the steering shaft 45 and the steering gear 510 by universal joints or U-joints 506.

In the initial condition of the mounting assembly 30, the telescoping device 500 has a first, contracted length, indicated by L1, which substantially corresponds with the distance between the steering shaft 45 and the steering gear 510. When the holding elements 170 fail due to the force F of the occupant impacting the underside of the steering column 40 or steering wheel 42, the steering column rotates in the clockwise direction, indicated by R3, about the pivot shaft 160 and relative to the vehicle, as shown in FIG. 9B. This rotation of the steering column 40 causes the steering shaft 45 to rotate in the direction R3 away from the steering gear 510, thereby increasing the distance between the steering shaft and the steering gear.

As the steering shaft 45 moves away from the steering gear 510, the first and second members 502, 504 of the telescoping device 500 move axially relative to one another in a telescoping manner such that the telescoping device reaches a condition that has a second, extended length, indicated by L2, which is longer than the first length L1. The universal joint connections 506 between the telescoping device 500 and the steering shaft 45 and steering gear 510, respectively, ensure that the telescoping device maintains the ability to transfer rotational movement of the steering shaft to the steering gear during extension of the telescoping device under the influence of the steering column 40 rotating in the direction R3.

The preferred embodiments of the invention have been illustrated and described in detail. However, the present invention is not to be considered limited to the precise construction disclosed. Various adaptations, modifications and uses of the invention may occur to those skilled in the art to which the invention relates and the intention is to cover hereby all such adaptations, modifications, and uses which fall within the spirit or scope of the appended claims.

Having described the invention, the following is claimed:

1. An apparatus for supporting a steering column in a vehicle adjacent an instrument panel of the vehicle, the apparatus comprising:

a mounting assembly that connects the steering column to the vehicle, the mounting assembly including at least one holding element having a first condition that blocks pivotal movement of the steering column relative to the instrument panel, the at least one holding element having a second condition that permits pivotal movement of the steering column relative to the instrument panel, the at least one holding element changing from the first condition to the second condition in response to impact forces urging the steering column to pivot relative to the instrument panel.

2. The apparatus recited in claim 1, wherein the at least one holding element is ruptured to place the at least one holding element in the second condition.

3. The apparatus recited in claim 1, wherein the at least one holding element is placed in the second condition in response to occupant engagement with the steering column.

4. The apparatus recited in claim 3, wherein the mounting assembly is adapted to permit the steering column to pivot upward towards the instrument panel in response to occupant impact with the steering column and prevents pivotal movement of the steering column downward away from the instrument panel.

5. The apparatus recited in claim 1, wherein the steering column is axially immovable when the at least one holding element is in the second condition.

6. The apparatus recited in claim 1, wherein the mounting assembly comprises:
a first bracket for being secured to the steering column; and
a second bracket for being secured to the instrument panel, the second bracket being pivotably connected to the first bracket, the at least one holding element when in the first condition extending through a portion of the first bracket and a portion of the second bracket and thereby blocking pivotal movement of the first bracket relative to the second bracket.

7. The apparatus recited in claim 6, wherein the at least one holding element is rupturable in response to a predetermined degree of force urging the first bracket to pivot relative to the second bracket.

8. The apparatus recited in claim 6, wherein the second bracket includes at least one projection for limiting the amount of pivotal movement of the first bracket relative to the second bracket.

9. The apparatus recited in claim 6, wherein the first bracket has a welded connection with the steering column.

10. The apparatus recited in claim 6, wherein the first bracket comprises separate portions welded to the steering column.

11. The apparatus recited in claim 6 further comprising a pivot shaft that pivotably connects the first bracket to the second bracket, each holding element being spaced a predetermined distance from the pivot shaft to adjust the amount of impact force needed to place the at least one holding element in the second condition.

12. The apparatus recited in claim 1, wherein the steering column extends along an axis when the at least one holding element is in the first condition, the mounting assembly blocking the steering column from pivoting to a position below the axis when the at least one holding element is in the second condition.

13. The apparatus recited in claim 1, wherein the at least one holding element comprises one of a pin and a rivet.

14. An apparatus for a steering column comprising a steering shaft rotatable about a steering axis to effectuate steering movement of vehicle wheels, the apparatus comprising:
a mounting assembly for connecting the steering column to the vehicle adjacent an instrument panel of the vehicle, the mounting assembly comprising:
a first bracket connectable to the steering column;
a second bracket connectable to the vehicle;
a hinged connection interconnecting the first and second brackets for pivotal movement relative to each other; and
a holding element having a first condition blocking pivotal movement of the first bracket relative to the second bracket, the holding element having a second condition permitting pivotal movement of the first bracket relative to the second bracket, the holding element changing from the first condition to the second condition in response to a predetermined amount of force applied to the steering column and urging pivotal movement of the first bracket relative to the second bracket.

15. The apparatus recited in claim 14, wherein the at least one holding element is ruptured to place the at least one holding element in the second condition due to relative movement between the first bracket and the second bracket.

16. The apparatus recited in claim 14, wherein the steering column is axially immovable when the at least one holding element is in the second condition.

17. The apparatus recited in claim 14, wherein the mounting assembly is adapted to permit the steering column to pivot upward towards the instrument panel when the at least one holding element is in the second condition.

18. The apparatus recited in claim 14, wherein the second bracket includes at least one projection for limiting the amount of pivotal movement of the first bracket relative to the second bracket.

19. The apparatus recited in claim 14, wherein the first bracket is prevented from pivoting relative to the second bracket in one direction.

20. The apparatus recited in claim 14, wherein the first bracket comprises separate portions connected to the steering column.

21. The apparatus recited in claim 14 further comprising a pivot shaft that pivotably connects the first bracket to the second bracket, wherein each holding element is spaced a predetermined distance from the pivot shaft to adjust the amount of predetermined force needed to place the at least one holding element in the second condition.

22. The apparatus recited in claim 14, wherein when the at least one holding element is in the first condition, the mounting bracket blocks the steering column from pivoting to a position below the axis when the at least one holding element is in the second condition.

23. The apparatus recited in claim 14, wherein each of the at least one holding elements comprises a biasing member that moves to the second condition when the predetermined amount of force is applied to the steering column.

24. The apparatus recited in claim 14, wherein the at least one holding element comprises one of a pin and a rivet.

25. An apparatus for supporting a steering column in a vehicle that includes a steering gear and extends in a fore-aft direction, the steering column comprising a steering shaft rotatable about a steering axis to effectuate steering movement of vehicle wheels, the apparatus comprising:
a mounting assembly that pivotably connects the steering column to the vehicle, the mounting assembly having a first condition for positioning the steering column such that the steering axis extends at a first angle relative to the fore-aft direction of the vehicle, the mounting assembly having a second condition for positioning the steering column such that the steering axis extends at a second, different angle relative to the fore-aft direction of the vehicle in response to impact forces urging the steering column to pivot relative to the instrument panel; and
a telescoping device for rotatably connecting the steering column to the steering gear, the telescoping device having a first length when the mounting assembly is in the first condition and a second, greater length when the mounting assembly is in the second condition.

26. The apparatus as set forth in claim 1, wherein the steering column extends in a fore-aft direction of the vehicle, the steering column including a steering shaft rotatable about a steering axis to effectuate steering movement of vehicle wheels, the mounting assembly pivotably connecting the steering column to the vehicle, the mounting assembly positioning the steering column such that the steering axis extends at a first angle relative to a fore-aft direction of the vehicle when the at least one holding element is in the first condition, the mounting assembly positioning the steering column such that the steering axis extends at a second, different angle relative to the fore-aft direction of the vehicle in response to impact forces urging the steering column to pivot relative to the instrument panel, a telescoping device rotatably connecting the steering column to a steering gear of the vehicle, the telescoping device having a first length when the at least one holding element is in the first condition and a second, greater length when the at least one holding element is in the second condition.

\* \* \* \* \*